(12) United States Patent
Shea et al.

(10) Patent No.: US 6,725,959 B1
(45) Date of Patent: Apr. 27, 2004

(54) MOTORIZED SNOW BOARD VEHICLE

(76) Inventors: Raymond Shea, 8507 114th St., NW., Gig Harbor, WA (US) 98332; Jeff Cooley, 13418 Crescent Valley Dr., Gig Harbor, WA (US) 98332

( * ) Notice: Subject to any disclaimer, the term of this patent is extended or adjusted under 35 U.S.C. 154(b) by 0 days.

(21) Appl. No.: 10/323,405

(22) Filed: Dec. 18, 2002

Related U.S. Application Data

(60) Provisional application No. 60/342,249, filed on Dec. 20, 2001.

(51) Int. Cl.$^7$ .............................................. B62M 27/02
(52) U.S. Cl. ..................................................... 180/190
(58) Field of Search ................................ 180/182, 190, 180/14.1, 14.2, 11, 15, 186, 187

(56) References Cited

U.S. PATENT DOCUMENTS

| | | | | |
|---|---|---|---|---|
| 3,853,192 A | * | 12/1974 | Husted | 180/181 |
| 3,964,560 A | * | 6/1976 | Husted | 180/181 |
| 4,984,648 A | * | 1/1991 | Strzok | 180/181 |
| 5,568,840 A | * | 10/1996 | Nagata et al. | 180/190 |
| 6,193,003 B1 | * | 2/2001 | Dempster | 180/180 |

* cited by examiner

*Primary Examiner*—Kevin Hurley
(74) *Attorney, Agent, or Firm*—Gregory J. Nelson

(57) ABSTRACT

The present invention provides a unique recreational vehicle in the form of a powered snow board for traversing snow-covered or wet, sandy surfaces. The motorized vehicle has a front board similar in size and shape to a conventional snow board. The board carries bindings in which the rider may step onto so the rider can maneuver the board in a manner similar to that of a conventional snow board. The rear drive unit has a motor which powers a flexible track having a tread similar to the tread utilized on snow mobiles. The tread is carried on a swing arm assembly which is biased into the snow surface but will pivot to absorb bumps and to provide tracking and control. The rear drive unit is connected to the rear of the snow board by a pivot connection which allows the front board to be maneuvered by the rider while being powered by the drive unit. Turns are initiated with the rider's toe and heel and completed by the steering system. A tiller-type steering arrangement operates through a mechanical linkage to assist in controlling the board. The upper end of the tiller carries the motor throttle controls and brake control at a location convenient to the rider.

15 Claims, 4 Drawing Sheets

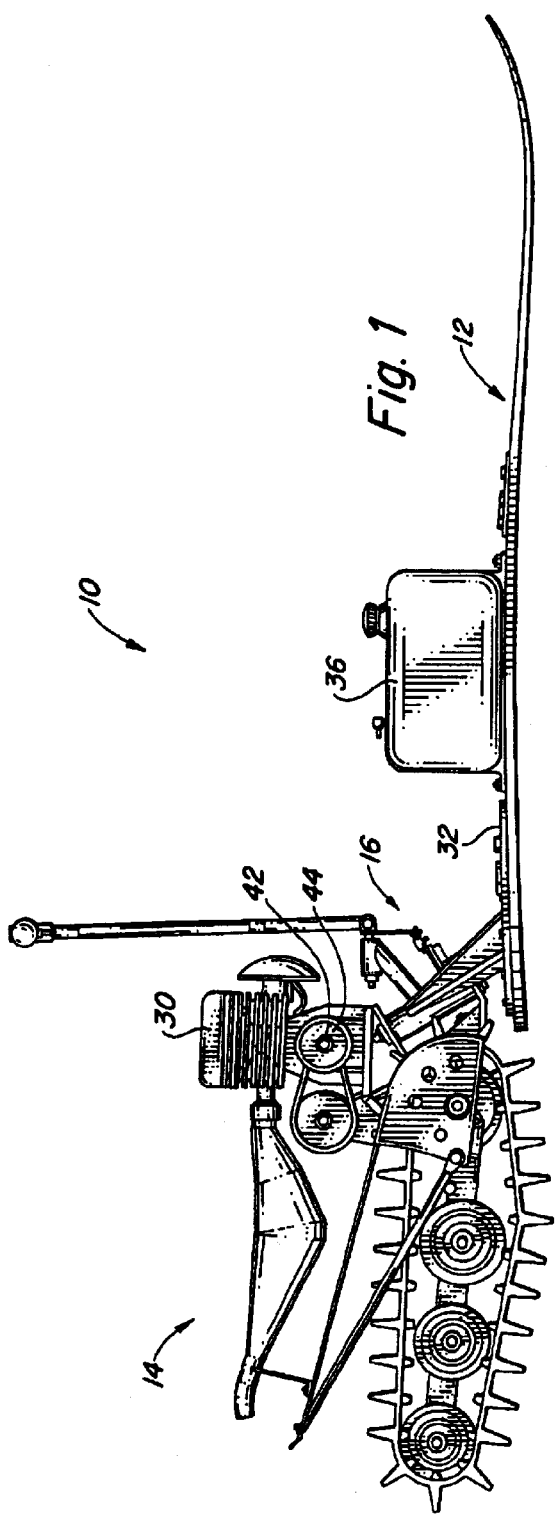
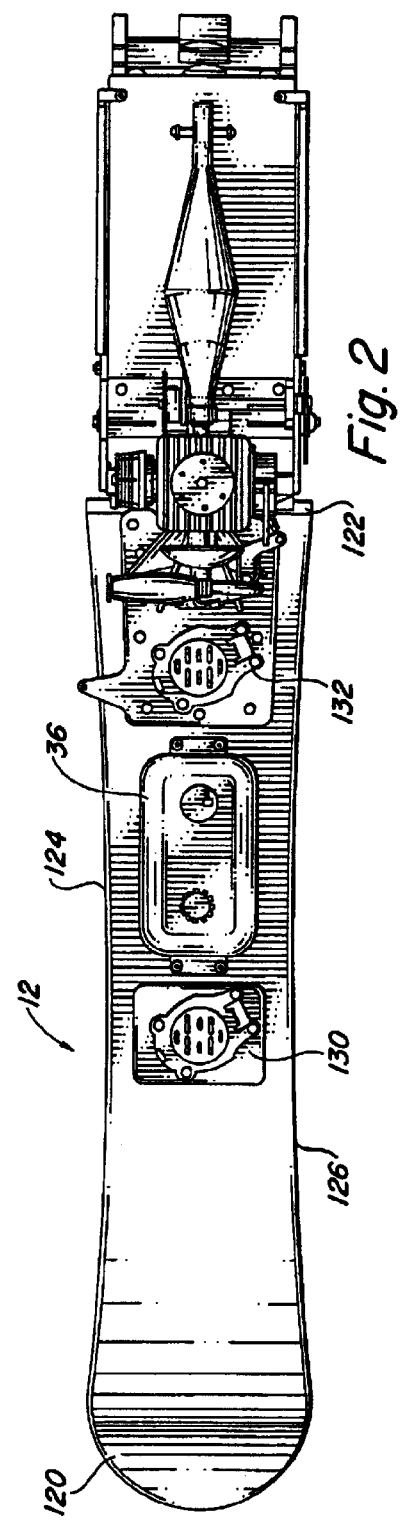

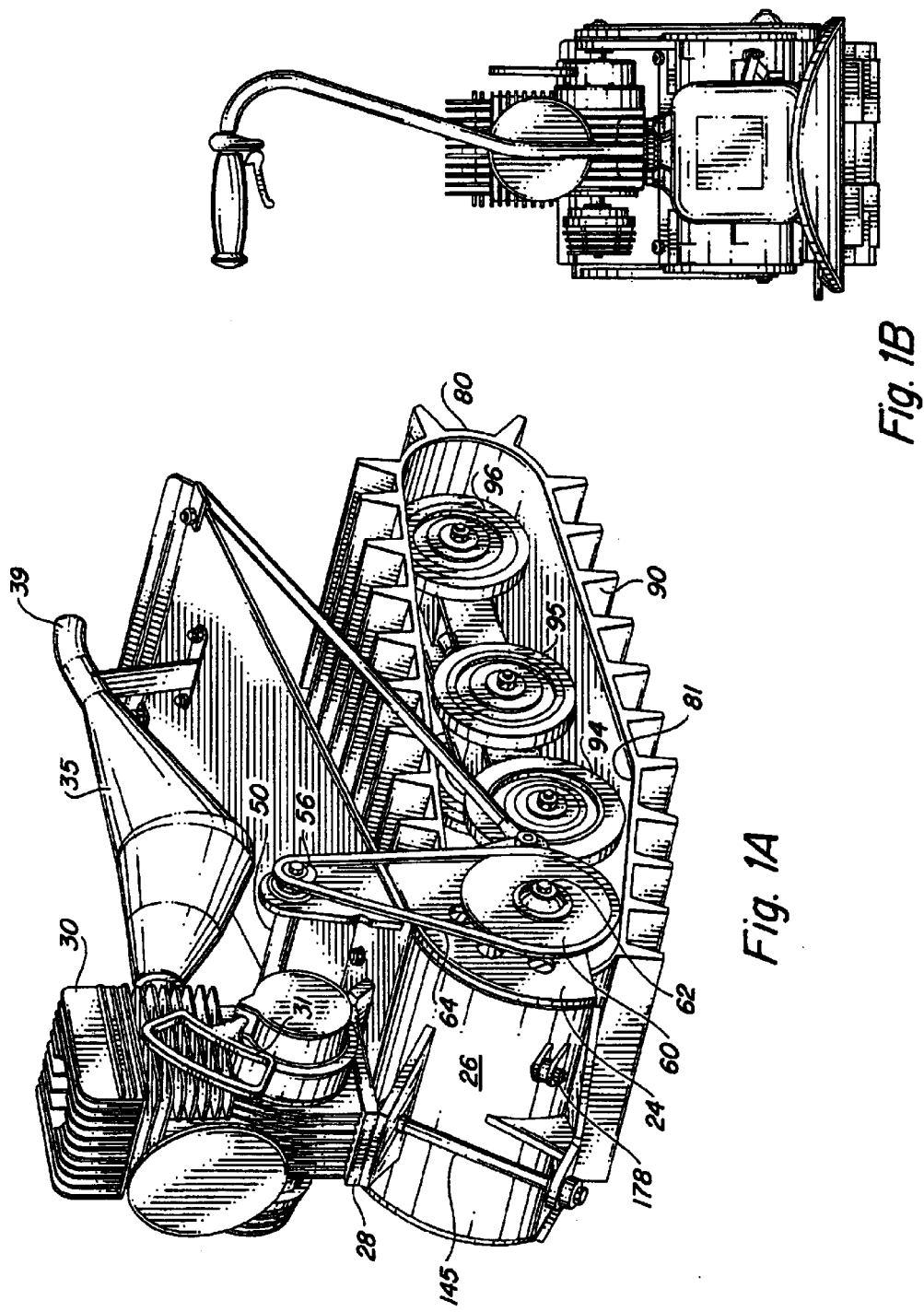

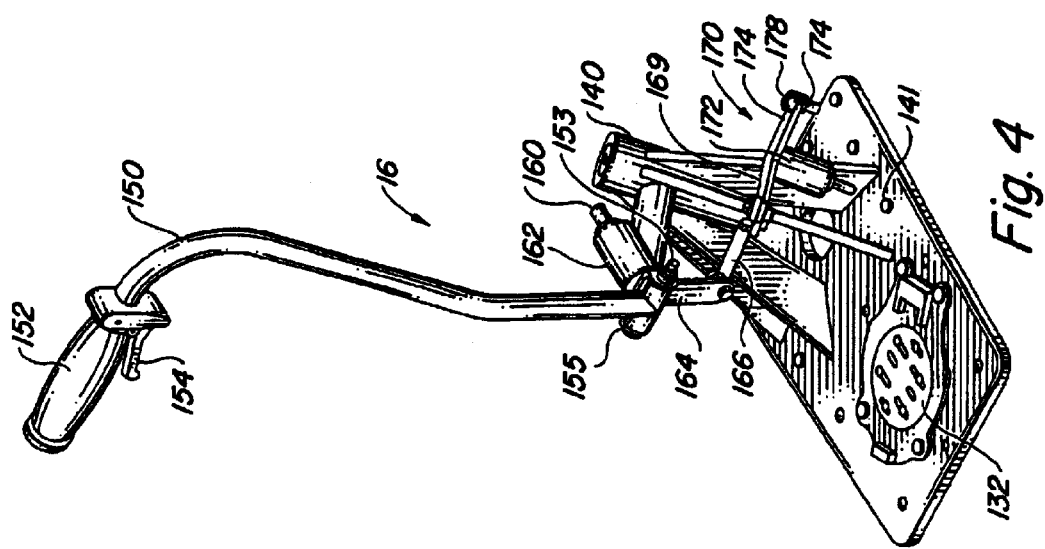

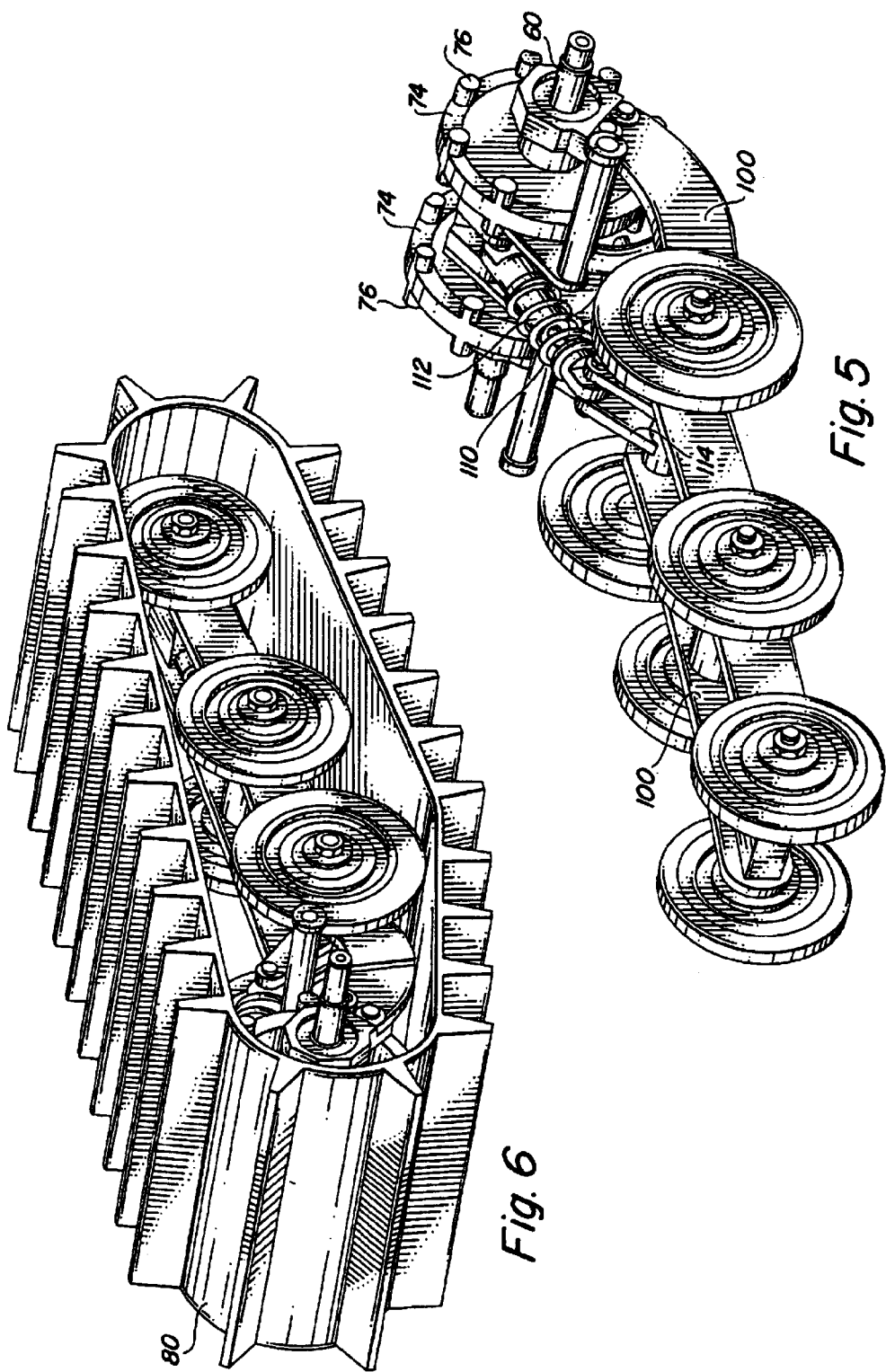

MOTORIZED SNOW BOARD VEHICLE

CROSS REFERENCE TO RELATED APPLICATION

This application relates to application SN 60/342,249, filed Dec. 20, 2001, entitled "Motorized Ski Vehicle."

FIELD OF THE INVENTION

The present invention relates to a recreational vehicle and more particularly relates to a motorized or powered snow board.

BACKGROUND OF THE INVENTION

Various types of motorized sled-type or ski vehicles can be found in the prior art. For example, U.S. Pat. No. 3,750,776 shows a motorized sled-type vehicle having a power-driven traction wheel at the rear of the vehicle body. The vehicle body is supported on ski-type runners. The seated operation can apply tractional power to the wheel and may steer by turning the motor mount on the swivel.

U.S. Pat. No. 4,286,682 describes a power driven ski bob having the driving tracks of a rear power ski located beneath the seat. The front end of the power ski is pivotally mounted forward of the seat. The rear end of the power ski is biased or urged into engagement with the snow. Impact forces are cushioned by means of a lost motion connection and a shock absorber. The front ski and fuel tanks are detachably connected to the frame.

U.S. Pat. No. 4,260,036 entitled "Powered Ski" describes a ski device having a power unit for providing forward thrust capable of operation over water, snow and similar surfaces. The frame has a chassis with a seat and handles which include the controls and which is articulated on a single runner. The power unit may be mounted in the chassis or rearwardly of the seat. The power unit is as shown as a motor driven propellor. The frame work may be adjustable to permit the angle of thrust imparted by the power unit to be varied.

U.S. Pat. No. 4,244,436 entitled "Vehicle with Power Driven Ski" shows a ski bob driven by a power ski having a pair of running surfaces for sliding engagement with the snow. Each of the running surfaces is located intermediate an outboard turning flange. Preferably, the running surfaces are inclined in the transverse direction and their inner edges define a pair of inner reaction or turning edges parallel to the outer turning flanges. The running surfaces are configured to reduce wear as the propulsion track as it enters and exits underside of the ski.

U.S. Pat. No. 4,613,006 shows a belt driven cycle. The device has a rear drive track. Cleats extend transversely of the outer surface of the track and are curved to facilitate leaning of the vehicle as it travels around a curve. In a preferred embodiment the vehicle includes a ski mounted on front forks so the vehicle can be used for recreational purposes in snow. A wheel can be fitted in place of the ski if desired.

U.S. Pat. No. 4,823,903 shows a motorized snow vehicle having a front steering assembly and a rear support assembly including a chassis and a motor activating a tread. The front steering assembly has a steering column which is pivotal and which carries a front runner ski.

U.S. Pat. No. 4,984,648 relates to a motorized skiboard having a central opening with a drive belt mounted in the opening and driven by a motor. Foot rests on the housing are located on either side of the motor. The belt drive is a plurality of linkages which attach with drive bars. When the belt is propelling the skiboard, the drive bars pivot into ground engaging position. When the skiboard is sliding, the drive bars pivot into a non-ground engaging position to permit the board to freely slide on a surface.

While the above recreational devices operate on snow and ice and may provide the user with transportation, recreation and enjoyment, they generally are skibob-type devices having a front steering ski and a rear motorized power unit. Generally, in operation, the user sits on a seat and steers the device by turning the front ski similar to the operation of a bicycle.

More recently, snow boards have become very popular. Snow boards are generally made of a high strength composite materials having a length of about 65 inches and a width of about 12 inches. The particular shape, size, side cut may vary depending upon the size and ability of the rider as well as the type of performance desired in snow conditions. The rider assumes a position on the board in the click-on or step-in binding and using legs and body rotation maneuvers the board. Unlike traditional skiing, snow boarders do not utilize ski poles and both feet are positioned spaced-apart on a single wider board.

U.S. Pat. No. 6,435,290 relates to a land vehicle having a flexible frame with a belt with treads. An engine drives a roller. Boot supports are fixed to the frame and support a standing rider. The vehicle is controlled by the rider twisting and tipping in a manner similar to a conventional snow board although the rider is elevated above the snow surface.

Accordingly, while various snow vehicles are described above can be found in the prior art, none provide the rider the snow board experience allowing the rider to manipulate the board in a manner similar to snow boarding and being motorized so that the device may be operated on relatively flat or uphill terrain.

BRIEF SUMMARY OF THE INVENTION

Briefly, the present invention provides a unique recreational vehicle in the form of a powered snow board. The motorized vehicle has a front board similar in size and shape to a conventional snow board. The front board carries bindings in which the rider may engage so the rider can maneuver the front board in a manner similar to that of a conventional snow board. The rear drive or power module unit has a motor which powers a flexible track having a tread similar to the tread utilized on snow mobiles. The tread is on a swing arm which is spring biased into the surface and will pivot to absorb bumps and to provide tracking and control. The rear drive unit is connected to the rear of the snow board by a pivot or articulated connection which allows the vehicle to be maneuvered by the rider on the front board while being powered by the drive unit. Turns are initiated with the rider's toe and heel and completed by the steering system. A tiller-type steering arrangement on the rear of the front board operates through a mechanical linkage to assist in controlling the board. The upper end of the tiller carries the motor throttle controls and brake control at a location convenient to the rider. The recreational vehicle will also operate on other surface such as wet, sandy beaches.

BRIEF DESCRIPTION OF THE DRAWINGS

The above and other objects and advantages of the present invention will become more apparent from the following description, claims and drawings in which:

FIG. 1 is a side view of the motorized vehicle of the present invention;

FIG. 1A is a perspective view of the rear drive unit;

FIG. 1B is a front view of the vehicle;

FIG. 2 is a top view of the vehicle;

FIG. 3 is a perspective view of the cowling located at the front of the rear drive unit;

FIG. 4 is a detail view showing the steering mechanism;

FIG. 5 is a detail view of the track and swing arm; and

FIG. 6 is a perspective view illustrating the drive arm and tread assembly.

DETAILED DESCRIPTION OF THE DRAWINGS

Turning now to the drawings, the vehicle or motorized sled of the present invention is generally designated by the numeral 10. The vehicle includes a forward mounted snow board 12, a rear power unit or drive module 14 and a connecting linkage assembly 16. The drive unit 14 consists of a cowling 20 (FIG. 3) having opposite side plates 22 and 24. The side plates may be any suitable shape but are shown as aluminum plates having cut-away sections for reduced weight. The side plates are connected by a curved nose plate 26 which may be welded or otherwise secured to the opposite side plates 22 and 24.

A motor 30 is mounted to the cowling 20 at horizontal mounting plate 28 projecting from the nose plate 26. The motor as shown is preferably a 2 or 4 cycle gas powered motor of the type used on racing carts. A 100 cc engine of the type manufactured by Yamaha has been found suitable for this purpose, although other types of power units may be used. The motor may be equipped with an electrical or manual pull-starter 31. Fuel for the motor is provided by a fuel tank 36 which is shown as a generally cylindrical tank mounted on an intermediate location on the upper surface of the forward board 12. The fuel tank is connected to the motor by a flexible fuel line 32 extending along the rear of the snow board. The exhaust from the motor 30 is directed through an exhaust system preferably including a muffler 35. The exhaust is directed rearwardly from the motor at the tail pipe 39 near the rear of the rear drive unit 14.

The motor 30 has an output shaft 42 extending transversely of the vehicle as best seen in FIG. 2. The output shaft 42 carries a centrifugal chain drive clutch 44 secured to the outer end of the shaft.

The drive system further includes a shaft 50 rearwardly of the motor extending transversely between the brackets 51, 52 mounted in suitable bearings at bores 54 in the cowling 20. The shaft carries a chain sprocket 56 and the sprocket 56 is connected to the output sprocket 60 on the track drive shaft 62 by power transmission means shown as roller chain. The clutch 44 is a centrifugal type of clutch such as the type manufactured by Horstman. The clutch will disengage when the motor speed drops below a predetermined RPM such as idle speed.

The outer end of the track drive shaft 62, adjacent to the side plate 24, carries a gear sprocket 60 which is driven by a pintle chain 64. The ratio between the smaller and larger sprockets 56, 60 is selected to provide the desired speed and torque characteristic. Generally, the gear ratio will be approximately primary drive 3:1 and secondary drive 3.4:1.

The lower sprocket 60 is carried on a shaft 62 rotatively supported in bearings in bore 25 in the cowling side 24. The drive shaft 60 is connected to a pair of drive wheels 74 located between the front end of the parallel swing arm assembly 100. The drive wheels 74 have lugs 76 which engage spaced-apart projections 81 on the inner surface of the endless propulsion track 80 which extends around the drive sprockets. The propulsion track 80 is similar to that utilized on snowmobiles having projecting cleats 90 which will engage the surface such as snow and propel or drive the vehicle in a forward direction. The direction of rotation of the endless track to propel the vehicle in a forward direction is indicated by the arrow in FIG. 1A.

Idler wheels 94, 95 and 96 are provided along swing arm assembly 100 to maintain the proper tension on the track and to maintain the track in engagement with the snow surface. As is conventional, the position of the sprockets can be adjusted to apply tension to the endless track. The swing arm assembly 100 pivots at its front end at bearings 102. A coil spring 110 extends around a sleeve 112 abutting stop 114 on the swing arm assembly. It will be seen that the swing arm 100 is biased or urged into traction with the snow or other surface but will react against the spring to pivot to provide shock absorption and improved control.

The front board 12 can be variously sized and shaped to generally conform to the shape of a conventional snow board being made of fiberglass and/or composite materials such as carbon fiber. The board 12 has a tip 120 and a tail 122 and opposite side edges 124, 126. The fuel tank is mounted at an intermediate location on the top surface of the board. Step-in or click-in bindings 130, 132 are positioned and located at forward and rear positions on the board so that the rider, in position, will basically straddle the tank with his or her feet.

Steering and control are imparted by the rider maneuvering the board and by mans of the steering mechanism 16. The steering mechanism 16 has a rearwardly inclined journal 140 on mounting plate 141 at the rear of the front board which pivotally receives shaft 145. Shaft 145 is attached to the cowling at plate 142. The articulated connection allows relative lateral pivotal motion between the rear of the front board and the front of the drive unit.

A tiller 150 having a handle 152 extends generally vertically adjacent the rear binding 132. Motor speed is controlled by a throttle lever 15A below the handle.

The tiller is forwardly and rearwardly pivotal along a longitudinal bias about shaft 153 and clevis 155. No control function accompanies this motion as the motion is to allow the user to position the tiller next to the rider's body in accordance with personal preference and comfort.

The tiller is laterally pivotal about shaft 160 in journal 162. Link 164 depends from the tiller below clevis 155 and is attached to pivot link or tie rod 166 at its lower end. The opposite end of pivot link 166 is attached to the upper arm 169 of bell crank 170. Bell crank 170 is pivoted at journal 172 on plate 141. The lower arm 174 of the bell crank is attached to the front of the cowling 26 at pivot 178.

Thus it will be seen that when the rider exerts a control movement in either lateral direction, the linkage will impart a steering force to the cowling which will cause the tail or rear of the front board to also swing in the same direction. Thus the rider can control the board by controlling speed at the throttle 154 and directional control is applied both at the bindings and by lateral movement of the tiller. Shock is absorbed by the spring arm as it pivots against the biasing spring. Longitudinal movement of the tiller is for rider stabilization and does not provide a steering control function.

It will be seen that the present invention provides a powered vehicle which will provide the rider the opportunity to experience a riding sensation very similar to that of a conventional snow board on flat snowy or wet sand surfaces. Control and turning is imparted in a manner similar to snow board maneuvering due to the pivot or articulated connection between the front board and the power drive unit.

It will be obvious that those skilled in the area will make various changes, alterations and modifications to the invention described herein. To the extent these various alterations, modifications and changes do not depart from the spirit or scope of the patented claims, they are intended to be encompassed therein.

We claim:

1. A motorized vehicle for transporting a rider in a standing position along a surface comprising:
   (a) a board having a front and rear ends and having a binding for securing the feet of the rider;
   (b) a power unit having a frame, said frame being pivotally secured to the rear of the board;
   (c) a motor mounted on said frame and having an output shaft;
   (d) a drive track having a swing arm pivotally at said frame and having a sprocket, said sprocket being driven by said motor output shaft;
   (e) said swing arm supporting an endless drive track and being biased into engagement with the said surface; and
   (f) steering means including a tiller pivotally connected to said board and said power unit frame whereby the rider may apply a control force to said drive track via said tiller.

2. The motorized vehicle of claim 1 wherein said motor is an internal combustion engine and said board carries a fuel tank.

3. The motorized vehicle of claim 1 wherein said centrifugal clutch is connected to said motor shaft.

4. The motorized vehicle of claim 1 wherein said swing arm includes idler wheels spaced along said swing arm.

5. The motorized vehicle of claim 1 wherein said drive track is a flexible endless track having external cleats.

6. The motorized vehicle of claim 5 wherein said sprocket has projections and said drive track has projections engaged by said projection to impart rotation to said track.

7. The motorized vehicle of claim 2 wherein said motor is provided with an exhaust system.

8. The motorized vehicle of claim 1 wherein said sprocket is driven by a chain drive.

9. The motorized vehicle of claim 1 wherein said frame includes a cowling extending across the front of the power unit.

10. A motorized vehicle for transporting a rider in a generally standing position along a surface comprising:
    (a) a front board being longitudinal having a front and rear ends and having a binding for securing the feet of the user in a riding position;
    (b) a rear power unit with a front and rear and having a cowling extending across the front thereof;
    (c) a motor mounted on said cowling and having an output shaft;
    (d) a drive train connected to the motor including a clutch;
    (e) a swing arm assembly pivotally connected to said cowling, said swing arm assembly carrying a drive wheel in driven engagement with said drive train and at least one idler;
    (f) biasing means urging said swing arm downwardly;
    (g) an endless track extending around said drive wheel and said idler; and
    (h) a pivotal connection between said front board and said power unit whereby a rider may maneuver the board by applying a controlling force at said bindings.

11. The vehicle of claim 10 wherein said pivotal connection includes a tiller operatively connected to a bell crank on said board, said bell crank having an arm pivotally connected to said power unit.

12. The vehicle of claim 11 wherein said tiller is pivotally on both a longitudinal direction and in a lateral direction and is connected to said bell crank to apply a directional control force only when the tiller is pivoted in a lateral direction.

13. The vehicle of claim 11 wherein the front board is elongate having an upwardly turned tip.

14. The vehicle of claim 10 wherein said pivot axis is rearwardly inclined and aligned with the longitudinal axis of the front board.

15. A motorized vehicle for transporting a rider in a generally standing position along a surface comprising:
    (a) a front longitudinally extending board having a binding for securing at least one foot of the rider;
    (b) a power unit having a frame and carrying a motor, said power unit being connected to said front board at a pivot axis aligned with the longitudinal axis; and
    (c) drive means driven by said power unit for propelling the vehicle across a surface.

* * * * *